United States Patent
Pani et al.

(10) Patent No.: US 8,498,284 B2
(45) Date of Patent: Jul. 30, 2013

(54) METHOD AND APPARATUS FOR ENHANCING RLC FOR FLEXIBLE RLC PDU SIZE

(75) Inventors: Diana Pani, Montreal (CA); James M. Miller, Verona, NJ (US); Paul Marinier, Brossard (CA); Stephen E. Terry, Northport, NY (US); Sudheer A. Grandhi, Mamaroneck, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1195 days.

(21) Appl. No.: 12/025,381

(22) Filed: Feb. 4, 2008

(65) Prior Publication Data

US 2008/0212561 A1  Sep. 4, 2008

Related U.S. Application Data

(60) Provisional application No. 60/887,831, filed on Feb. 2, 2007, provisional application No. 60/895,471, filed on Mar. 18, 2007, provisional application No. 60/913,728, filed on Apr. 24, 2007.

(51) Int. Cl.
*H04J 3/16* (2006.01)

(52) U.S. Cl.
USPC ........... 370/346; 370/310; 370/328; 370/329; 370/464; 370/478; 370/479; 370/480; 455/402; 455/422.1; 455/450

(58) Field of Classification Search
USPC ........... 370/310, 345, 346, 498; 455/450–454
See application file for complete search history.

(56) References Cited

U.S. PATENT DOCUMENTS

| | | | |
|---|---|---|---|
| 6,845,100 B1 * | 1/2005 | Rinne | 370/395.43 |
| 6,901,065 B1 * | 5/2005 | Ehrstedt et al. | 370/341 |
| 2002/0015385 A1 * | 2/2002 | Yi et al. | 370/236 |
| 2003/0099305 A1 | 5/2003 | Yi et al. | |
| 2004/0047331 A1 * | 3/2004 | Jang | 370/346 |
| 2004/0208160 A1 * | 10/2004 | Petrovic et al. | 370/350 |
| 2005/0190698 A1 | 9/2005 | Mangin et al. | |
| 2006/0045032 A1 | 3/2006 | Hamada | |

(Continued)

FOREIGN PATENT DOCUMENTS

| | | |
|---|---|---|
| JP | 2005-278167 A | 10/2005 |
| JP | 2006-067099 A | 3/2006 |

(Continued)

OTHER PUBLICATIONS

Nokia, Summary Document on Proposal of Changes for the HSPA Evolution TR, 3GPP TSG-RAN-WG2 Meeting #55, Oct. 13, 2006 (See IDS filed Nov. 16, 2012).*

(Continued)

*Primary Examiner* — Charles C Jiang
(74) *Attorney, Agent, or Firm* — Condo Roccia LLP

(57) ABSTRACT

Enhancements are provided for the radio link control (RLC) protocol in wireless communication systems where variable RLC packet data unit (PDU) size is allowed. When flexible RLC PDU sizes are configured by upper layers, radio network controller (RNC)/Node B flow control, RLC flow control, status reporting and polling mechanisms are configured to use byte count based metrics in order to prevent possible buffer underflows in the Node B and buffer overflows in the RNC. The enhancements proposed herein for the RLC apply to both uplink and downlink communications.

18 Claims, 4 Drawing Sheets

U.S. PATENT DOCUMENTS

| | | | | |
|---|---|---|---|---|
| 2006/0050723 | A1* | 3/2006 | Yu | 370/412 |
| 2006/0140158 | A1* | 6/2006 | Terry | 370/335 |
| 2006/0223585 | A1* | 10/2006 | Legg | 455/560 |
| 2010/0054139 | A1* | 3/2010 | Chun et al. | 370/252 |
| 2010/0062777 | A1* | 3/2010 | Nadas et al. | 455/445 |
| 2011/0093754 | A1 | 4/2011 | Chun et al. | |

FOREIGN PATENT DOCUMENTS

| | | |
|---|---|---|
| RU | 2280958 C2 | 7/2006 |
| RU | 2392752 C2 | 6/2010 |
| WO | WO 2005/048517 A1 | 5/2005 |

OTHER PUBLICATIONS

European Patent Application No. 08725182: Communication pursuant to Article 94(3) EPC, dated Nov. 5, 2010, pp. 1-5.

3rd Generation Partnership Project (3GPP), R2-063042, "Summary document on proposal of changes for the HSPA Evolution TR", Nokia, 3GPP TSG-RAN-WG2 Meeting #55, Seoul, Korea, Oct. 9-13, 2006, 2 pages.

Third Generation Partnership Project TSG-RAN2 Meeting #56bis, Change Request 3GPP TS 25.322 V7.2.0, Sorento, Italy, Jan. 15-19, 2007, R2-070034.

Third Generation Partnership Project, "Technical Specification Group Radio Access Network; Radio Interface Protocol Architecture (Release 6)", 3GPP TS 25.301 V6.2.0 (Mar. 2005).

Third Generation Partnership Project, "Technical Specification Group Radio Access Network; Radio Interface Protocol Architecture (Release 6)", 3GPP TS 25.301 V6.4.0 (Sep. 2005).

Third Generation Partnership Project, "Technical Specification Group Radio Access Network; Radio Interface Protocol Architecture (Release 6)", 3GPP TS 25.301 V6.5.0 (Sep. 2007).

Third Generation Partnership Project, "Technical Specification Group Radio Access Network; Radio Interface Protocol Architecture (Release 7)", 3GPP TS 25.301 V7.0.0 (Mar. 2006).

Third Generation Partnership Project, "Technical Specification Group Radio Access Network; Radio Interface Protocol Architecture (Release 7)", 3GPP TS 25.301 V7.3.0 (Sep. 2007).

Third Generation Partnership Project, "Technical Specification Group Radio Access Network; Radio Interface Protocol Architecture (Release 8)", 3GPP TS 25.301 V8.0.0 (Dec. 2007).

Third Generation Partnership Project, "Technical Specification Group Radio Access Network; Medium Access Control (MAC) Protocol Specification (Release 6)", 3GPP TS 25.321 V6.6.0 (Sep. 2005).

Third Generation Partnership Project, "Technical Specification Group Radio Access Network; Medium Access Control (MAC) Protocol Specification (Release 6", 3GPP TS 25.321 V6.11.0 (Dec. 2006).

Third Generation Partnership Project, "Technical Specification Group Radio Access Network; Medium Access Control (MAC) Protocol Specification (Release 6)", 3GPP TS 25.321 V6.14.0 (Sep. 2007).

Third Generation Partnership Project, "Technical Specification Group Radio Access Network; Medium Access Control (MAC) Protocol Specification (Release 7)", 3GPP TS 25.321 V7.3.0 (Dec. 2006).

Third Generation Partnership Project, "Technical Specification Group Radio Access Network; Medium Access Control (MAC) Protocol Specification (Release 7)", 3GPP TS 25.321 V7.7.0 (Dec. 2007).

Third Generation Partnership Project, "Technical Specification Group Radio Access Network; Medium Access Control (MAC) Protocol Specification (Release 8)", 3GPP TS 25.321 V8.0.0 (Dec. 2007).

Third Generation Partnership Project, "Technical Specification Group Radio Access Network; Radio Link Control (RLC) Protocol Specification (Release 7)", 3GPP TS 25.322 V7.1.0 (Jun. 2006).

Third Generation Partnership Project, "Technical Specification Group Radio Access Network; Radio Link Control (RLC) Protocol Specification (Release 7)", 3GPP TS 25.322 V7.2.0 (Sep. 2006).

Third Generation Partnership Project, "Technical Specification Group Radio Access Network; Radio Link Control (RLC) Protocol Specification (Release 7)", 3GPP TS 25.322 V7.5.0 (Dec. 2007).

Third Generation Partnership Project, "Technical Specification Group Radio Access Network; Radio Link Control (RLC) Protocol Specification (Release 8)", 3GPP TS 25.322 V8.0.0 (Dec. 2007).

Third Generation Partnership Project, "Technical Specification Group Radio Access Network; RRC Protocol Specification (Release 1999)", 3GPP TS 25.331 V3.5.0 (Dec. 2000).

Third Generation Partnership Project, "Technical Specification Group Radio Access Network; Radio Resource Control (RRC) Protocol Specification (Release 1999)", 3GPP TS 25.331 V3.21.0 (Dec. 2004).

Third Generation Partnership Project, "Technical Specification Group Radio Access Network; Radio Resource Control (RRC) Protocol Specification (Release 4)", 3GPP TS 25.331 V4.17.0 (Mar. 2005).

Third Generation Partnership Project, "Technical Specification Group Radio Access Network; Radio Resource Control (RRC) Protocol Specification (Release 4)", 3GPP TS 25.331 V4.18.0 (Dec. 2007).

Third Generation Partnership Project, "Technical Specification Group Radio Access Network; Radio Resource Control (RRC) Protocol Specification (Release 5)", 3GPP TS 25.331 V5.19.0 (Dec. 2006).

Third Generation Partnership Project, "Technical Specification Group Radio Access Network; Radio Resource Control (RRC) Protocol Specification (Release 5)", 3GPP TS 25.331 V5.21.0 (Dec. 2007).

Third Generation Partnership Project, "Technical Specification Group Radio Access Network; Radio Resource Control (RRC) Protocol Specification (Release 6)", 3GPP TS 25.331 V6.12.0 (Dec. 2006).

Third Generation Partnership Project, "Technical Specification Group Radio Access Network; Radio Resource Control (RRC) Protocol Specification (Release 6)", 3GPP TS 25.331 V6.16.0 (Dec. 2007).

Third Generation Partnership Project, "Technical Specification Group Radio Access Network; Radio Resource Control (RRC) Protocol Specification (Release 7)", 3GPP TS 25.331 V7.3.0 (Dec. 2006).

Third Generation Partnership Project, "Technical Specification Group Radio Access Network; Radio Resource Control (RRC) Protocol Specification (Release 7)", 3GPP TS 25.331 V7.7.0 (Dec. 2007).

Third Generation Partnership Project, "Technical Specification Group Radio Access Network; Radio Resource Control (RRC) Protocol Specification (Release 8)", 3GPP TS 25.331 V8.1.0 (Dec. 2007).

Third Generation Partnership Project, "Technical Specification Group Radio Access Network; UTRAN Iur interface user plane protocols for Common Transport Channel data streams (Release 7)", 3GPP TS 25.425 V7.3.0 (Dec. 2006).

Third Generation Partnership Project, "Technical Specification Group Radio Access Network; UTRAN Iur interface user plane protocols for Common Transport Channel data streams (Release 7)", 3GPP TS 25.425 V7.5.0 (Sep. 2007).

Third Generation Partnership Project, "Technical Specification Group Radio Access Network; UTRAN Iur interface user plane protocols for Common Transport Channel data streams (Release 7)", 3GPP TS 25.425 V7.6.0 (Dec. 2007).

Third Generation Partnership Project TSG-RAN WG3 Meeting #56, 3GPP TS 25.425 CR 118, R3-071227, May 2007.

Third Generation Partnership Project, "Technical Specification Group Radio Access Network; UTRAN $I_{ub}$ Interface User Plane Protocols for Common Transport Channel data streams (Release 7)", 3GPP TS 25.435 V7.3.0 (Dec. 2006).

Third Generation Partnership Project, "Technical Specification Group Radio Access Network; UTRAN $I_{ub}$ Interface User Plane Protocols for Common Transport Channel data streams (Release 7)", 3GPP TS 25.435 V7.5.0 (Jun. 2007).

Third Generation Partnership Project, "Technical Specification Group Radio Access Network; UTRAN $I_{ub}$ Interface User Plane Protocols for Common Transport Channel data streams (Release 7)", 3GPP TS 25.435 V7.7.0 (Dec. 2007).

Third Generation Partnership Project TSG-RAN WG3 Meeting #56, 3GPP TS 25.435 CR 170, R3-071226, May 2007.

Third Generation Partnership Project, "Technical Specification Group Radio Access Network; High Speed Downlink Packet Access: Iub/Iur protocol aspects (Release 5)", 3GPP TS 25.877 V5.1.0 (Jun. 2002).

"Universal Mobile Telecommunications System (UMTS); Radio Link Control (RLC) protocol specification (3GPP TS 25.322 V7.3.0 Release 7)," ETSI TS 125 322 V7.3.0 (Jun. 2007).

* cited by examiner

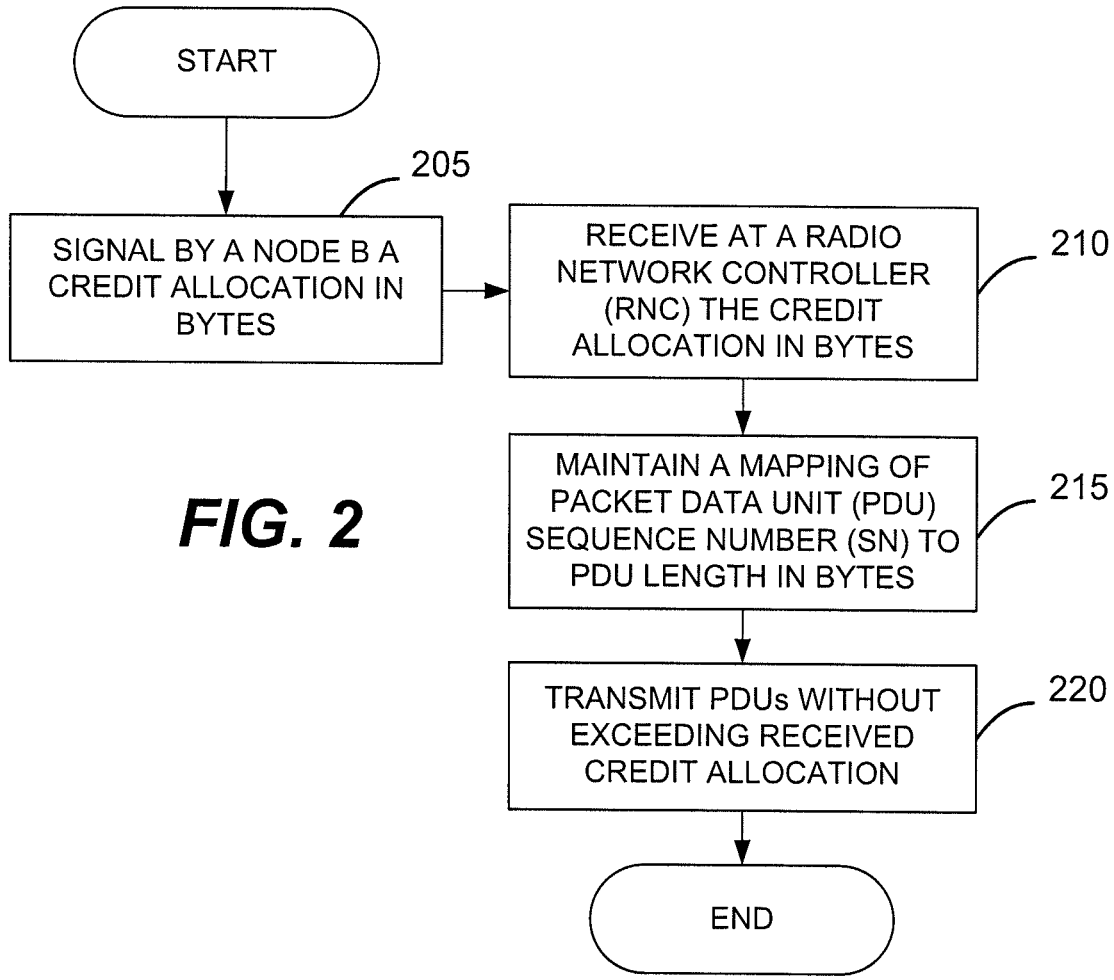

METHOD AND APPARATUS FOR ENHANCING RLC FOR FLEXIBLE RLC PDU SIZE

CROSS REFERENCE TO RELATED APPLICATIONS

This application claims the benefit of U.S. provisional application Nos. 60/887,831, filed Feb. 2, 2007, 60/895,471, filed Mar. 18, 2007, and 60/913,728, filed Apr. 24, 2007, which are incorporated by reference as if fully set forth.

FIELD OF INVENTION

This application is related to wireless communications.

BACKGROUND

High speed packet access evolution (HSPA+) herein refers to the Third Generation Partnership Project (3GPP) radio-access technology evolutionary enhancement of high speed downlink packet access (HSDPA) and high speed uplink packet access (HSUPA) standards used in Universal Mobile Telecommunications Systems (UMTS) wireless communications systems. Some of the improvements to HSDPA (3GPP UMTS Standard Release 5) and HSUPA (3GPP UMTS Standard Release 6) proposed as part of HSPA+ include higher data rates, higher system capacity and coverage, enhanced support for packet services, reduced latency, reduced operator costs, and backward compatibility with 3GPP legacy systems. Herein, 3GPP legacy systems generally refer to any one or more of the pre-existing 3GPP standards from Release 6 and earlier. Achieving these improvements involves the evolution of both the radio interface protocol and network architecture.

The following list includes relevant abbreviations:
3GPP—Third Generation Partnership Project
AM—Acknowledged Mode
AMD—Acknowledged Mode Data
ARQ—Automatic Repeat Request
CN—Core Network
CP—Control Plane
CS—Circuit Switched
DL—Downlink
HARQ—Hybrid Automatic Repeat Request
HSDPA—High Speed Downlink Packet Access
HSUPA—High Speed Uplink Packet Access
IP—Internet Protocol
LCID—Logical Channel Identifier
LTE—Long Term Evolution
MAC—Medium Access Control
PDCP—Packet Data Convergence Protocol
PDU—Packet Data Unit
PHY—Physical
PS—Packet Switched
QoS—Quality of Service
RAN—Radio Access Network
RLC—Radio Link Control
RNC—Radio Network Controller
CRNC—Controlling RNC
SRNC—Serving RNC
RNS—Radio Network Subsystem
RoHC—Robust Header Compression
RRC—Radio Resource Control
RRM—Radio Resource Management
Rx—Reception/Receiving
SAP—Service Access Point
SDU—Service Data Unit
SN—Sequence Number
TB—Transport Block
TBS—Transport Block Set
TF—Transport Format
TFC—Transport Format Combination
TFRC—Transport Format Resource Combination
TM—Transparent Mode
TM—Transparent Mode Data
Tx—Transmission/Transmitting
UE—User Equipment
UL—Uplink
UM—Unacknowledged Mode
UMD—Unacknowledged Mode Data
UP—User Plane
UMTS—Universal Mobile Telecommunications System
UTRAN—Universal Terrestrial Radio Access Network
WTRU—Wireless Transmit/Receive Unit The Layer 2 radio interface protocols include medium access control (MAC) and radio link control (RLC) protocols. Some of the functions of the MAC and RLC protocols are discussed hereinafter, however, other functions that are not discussed are assumed to function as described in 3GPP standards.

Some of the main functions of the MAC protocol are:
Channel mapping of MAC packet data units (PDUs) to physical channels
Multiplexing of higher layer data into packet data units (PDUs)
Quality of Service (QoS) that takes into account data priority for scheduling and rate control
Link adaptation for QoS and multiplexing
Hybrid automatic repeat request (HARQ) for control of fast retransmissions for error correction The MAC layer multiplexes higher layer data into MAC PDUs. The MAC PDUs that are sent to the physical (PHY) layer are called transport blocks (TBs). A set of TBs, referred to as a transport block set (TBS), are sent every transport time interval (TTI) to the PHY layer with a corresponding Transport Format (TF) that describes the physical layer attributes for that TBS. If the TBS is derived from combining or multiplexing data from more than one logical RLC channel, then a combination of TFs known as transport format combination (TFC) is used. As part of link adaptation, the MAC layer performs the TFC selection based on RLC logical channel priority, RLC buffer occupancy, physical channel conditions, and logical channel multiplexing. The reference to MAC TFC selection here is generic and may include, for example, transport format resource combination (TFRC) selection in the high speed MAC (MAC-hs) protocol in HSDPA.

The RLC protocol in Layer 2 has a big impact on the latency and throughput of data. The RLC protocol in 3GPP legacy systems, including Release 6 and earlier, is physically located in the radio network controller (RNC) node.

Some of the main functions of the transmitting (Tx) RLC protocol that occur in the Tx RLC entity are:
Macro-diversity to enable a UE to be connected simultaneously to two or more cells and receive data (optional)
Segmentation of higher layer radio bearers
Concatenation of higher layer radio bearers
Error detection and recovery of PDUs received in error
HARQ Assisted ARQ for fast retransmissions of PDUs received in error Some of the main functions of the receiving (Rx) RLC protocol that occur in the Rx RLC entity are:
Duplicate PDU detection
In sequence PDU delivery Error detection and recovery of PDUs received in error
HARQ Assisted ARQ for fast retransmission of PDUs received in error
Reassembly of higher layer data from received PDUs Three modes of operation for the RLC layer are acknowledged mode (AM), unacknowledged mode (UM) and transparent mode (TM). In AM operation, which includes the transmission of some higher layer user plane data, the RLC protocol is bi-directional, such that status and control information is sent from Rx RLC entity to Tx RLC entity. In TM and UM operation, which includes the transmission of some control plane radio resource control (RRC) signaling data, the RLC protocol is unidirectional, such that the Tx RLC entity and Rx RLC entity are independent with no status and control information exchanged. Also, some of the functions such as HARQ assisted ARQ and error detection and recovery are typically used only in AM operation.

The RLC PDU sizes are determined by the RRC layer based on the long term quality of service (QoS) requirements of the application data carried by the RLC logical channels. According to 3GPP legacy systems, including Release 6 and earlier, the RLC layer is configured on a semi-static basis by the RRC layer with predetermined RLC PDU sizes. Thus, the RLC PDU size is fixed on a semi-static basis by upper layers and sequence numbers (SNs) are assigned to the RLC PDUs. AM data RLC PDUs are numbered by modulo integer sequence numbers (SNs) cycling through the field 0 to 4095.

The RLC PDU types are DATA, CONTROL and STATUS. The DATA PDU is used to transfer user data, piggybacked STATUS information and the polling bit when RLC is operating in AM, where the polling bit is used to request a status report from the receiver. The CONTROL PDU is used for RLC RESET and RESET acknowledgement (ACK) commands. The STATUS PDU is used to exchange status information between two RLC entities operating in AM and can include super-fields (SUFIs) of different types including, for example, the Window Size SUFI and the Move Receiving Window (MRW) SUFI.

A transmission window refers to the group of PDUs that are being processed for transmission or are being transmitted currently. Similarly, the reception window generally refers to the group of PDUs being received or processed at the receiver. The transmission or reception window size typically refers to a number of PDUs that are being transmitted or received, respectively, by the system. The transmission and reception window sizes need to be managed using flow control in order not to overload the system and incur undesirable packet loss rates. Generally speaking, once a PDU has been successfully received at the receiver, a new PDU may be added to the transmission and/or reception window.

An RLC transmission window is composed of a lower bound and an upper bound. The lower bound consists of the SN of the PDU with lowest SN transmitted and the upper bound consists of the SN of the PDU with the highest SN transmitted. The RLC is configured with a maximum transmission window size, such that the maximum number of PDUs transmitted from the lower bound to the upper bound should not exceed the maximum window size. The RLC reception window is similarly configured. The lower bound of the RLC reception window is the SN following that of the last in-sequence PDU received and the upper bound is the SN of the PDU with the highest sequence number received. The reception window also has maximum window size, where the maximum expected PDU SN is equal to the lower bound SN plus the maximum configured window size. The transmission and reception windows are managed using transmission and reception state variables, respectively, as described hereinafter.

Among the techniques for flow control are RNC/Node B flow control, RLC flow control and RLC status reporting. RNC/Node B flow control refers to the procedures to minimize the downlink data buffered in the Node B. Typically, data destined for a UE flows from the Core Network (CN) through a source radio network controller (SRNC) and a Node B, and a drift radio network controller (DRNC) in a drift situation where the UE is handed off to a cell with a different radio network subsystem (RNS). The Node B grants allocation credits to the SRNC, and DRNC under drift, allowing the SRNC to send an equivalent number of PDUs to the Node B, such that the RNC can not send more PDUs until more credits are granted. RLC flow control refers to the managing of packet transfer, including window size, between the Tx RLC entity and the Rx RLC entity. RLC status reporting allows the receiver to report status information to the transmitter when polled by the transmitter.

According to 3GPP standards, various RLC protocol parameters for flow control are signaled by upper layers to the RLC layer, including the following parameters:
Poll_Window
Configured_Tx_Window_Size
Configured_Rx_Window_Size These parameters, described in further detail hereinafter, are used by the RLC layer along with various RLC state variables for flow control in order to configure transmission and reception window size. According to 3GPP legacy systems, such RLC state variables depend on SNs. For example, the following RLC transmitter state variables are affected by SNs:
VT(S) is the send state variable containing the SN of the next AM data PDU to be transmitted for the first time
VT(A) is the acknowledge state variable containing the SN following the SN of the last in-sequence acknowledged AMD PDU, and forms the lower edge of the transmission window
VT(MS) is the maximum send state variable containing the SN of the first AM data PDU that can be rejected by the peer receiver
VT(WS) is the transmission window size state variable All arithmetic operations on VT(S), VT(A), VT(MS), VR(R), VR(H) and VR(MR) depend on one or more SNs. The following RLC receiver state variables are also affected by SNs:
VR(R) is the receive state variable containing the SN following that of the last in-sequence AM data PDU received
VR(H) is the highest expected state variable containing the SN following the highest SN of any received AM data PDU
VR(MR) is the maximum acceptable receive state variable containing the SN of the first AM data PDU that shall be rejected by the receiver In 3GPP legacy systems, many functions needed to support data transfer service, such as RNC/NodeB flow control, RLC flow control and RLC status reporting, are based on SNs or effectively the number of PDUs when the RLC PDU size is fixed. The reason is that transmitting and receiving window size can be accurately characterized using the number of PDUs and the known and fixed PDU size. However, in proposals for HSPA+, the RLC may be configured by the upper layers to allow flexible RLC PDU sizes. If upper layers such as the RRC layer configure a flexible RLC PDU size operation then the RLC PDU size is variable up to a semi-statically specified maximum RLC PDU payload size.

It is recognized herein that existing SN based RLC operations may not function efficiently with flexible RLC PDU size. The reason is that using the number of PDUs to define window size will result in variable window size causing possible buffer overflows in the RNC and buffer underflows in the Node B. Accordingly, it would be beneficial to provide alternate methods for configuring window size for flexible RLC PDU size operations.

SUMMARY

Enhancements for radio link control (RLC) protocol for high speed packet access evolution (HSPA+) and other wireless systems, such as long term evolution (LTE) system, where variable RLC packet data unit (PDU) size is allowed are disclosed. When RLC PDU sizes are not fixed, radio network controller (RNC)/Node B flow control, RLC flow control, status reporting and polling mechanisms do not only depend on sequence numbers (SNs) or number of PDUs, but are configured to use byte count abased methods. The proposed byte count based methods for the RLC apply to both uplink and downlink communications.

BRIEF DESCRIPTION OF THE DRAWINGS

A more detailed understanding may be had from the following description, given by way of example and to be understood in conjunction with the accompanying drawings wherein:

FIG. 1 shows a structure of a super-field (SUFI) in an RLC STATUS packet data unit (PDU);

FIG. 2 shows a flow diagram of a RNC/Node B flow control using a byte-based credit allocation in accordance with the teaching herein;

DETAILED DESCRIPTION

Figure 3:
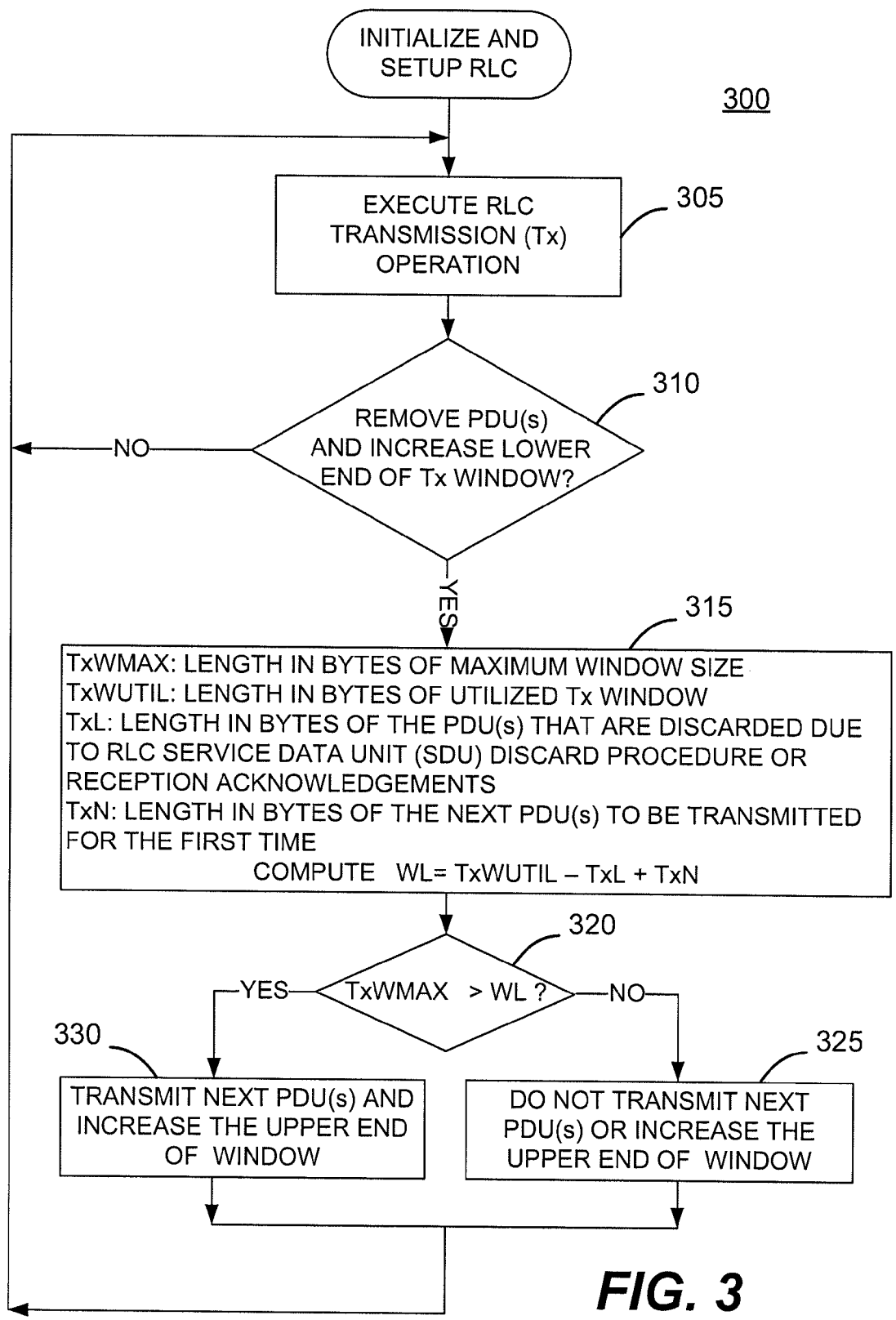
FIG. 3 shows a flow diagram of an RLC transmission (Tx) window update in accordance with the teaching herein.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Byte count based methods to enhance radio network controller (RNC)/Node-B flow control, radio link control (RLC) flow control, RLC status reporting and polling mechanisms for flexible RLC packet data unit (PDU) size are provided herein. The proposed enhancements enable efficient operation of RLC functions when RLC PDU size is flexible, improving legacy RLC functions based on sequence numbers (SNs) that were designed for fixed RLC PDU size. The proposed RLC enhancements apply to both uplink (UE to Universal Terrestrial Radio Access Network (UTRAN)) and downlink (UTRAN to UE) communications, and may be used in any wireless communication system including, but not limited to, high speed packet access evolution (HSPA+), long term evolution (LTE) and wideband code division multiple access (WCDMA) systems. For wireless systems such as LTE, UTRAN is equivalent to evolution UTRAN (E-UTRAN).

The proposed RLC enhancements may be used in architecture where the RLC operates either fully in the Node B, or partially in the RNC and partially in the Node-B. The proposed RLC enhancements are principally described herein with reference to HSPA+. Many functions and parameters are based on functions and parameters for HSDPA and HSUPA and may be understood in conjunction with 3GPP technical specifications (TSs) including the 3GPP RLC Protocol Specification for Release 7 (see 3GPP TS 25.322 V. 7.2.0) which is incorporated herein. It is assumed that the RLC can be configured by the higher layers to support flexible PDU size with a specified maximum RLC PDU payload size. It also assumed that the maximum RLC PDU size may be inferred from the specified maximum RLC PDU payload size. Alternatively, the maximum RLC PDU size may be directly specified. Also, the terms bytes and octets are used interchangeably, as well as terms transmitter and sender.

One or more of the following metrics may be used, alone or in combination, for defining and managing window size when flexible RLC PDU size is configured by the RRC:
  Number of bytes
  Number of blocks where each block is a fixed number of bytes
  Number of PDUs or sequence numbers (SNs)

The metric(s) used for window definition are signaled and negotiated during RRC setup, configuration and reconfiguration procedures for the radio bearer. The metric(s) for window size listed hereinbefore may be applied in all messaging that updates the window for flow control during a connection. For example, the window size metrics may be included in the Window Size super-field (SUFI) and Move Receiving Window (MRW) SUFI in RLC CONTROL or STATUS PDUs.

In the case of acknowledged mode (AM) RLC, to support flexible RLC PDU size in the RRC configuration and reconfiguration of RLC with radio bearer information elements (RLC Info), any one or more of the following information may be provided by the RRC to the RLC to signal the use of flexible RLC PDU size:

CHOICE Downlink RLC mode information including a new indicator for the flexible RLC PDU size mode in addition to the other RLC modes. When flexible RLC PDU size mode is indicated, the RLC entities may interpret the other RLC protocol parameters in accordance with this mode.

Any other new information element as part of RLC Info may also be used to indicate the flexible RLC PDU size mode.

Downlink (DL) RLC PDU size information in bits may be re-used and interpreted in the context of flexible RLC PDU size mode as follows:
    as an RLC scale parameter in octets (after dividing the number of bits by 8), sent specifically for scaling or multiplying other protocol parameters specified in the number of PDUs as described hereinafter, where the RLC Scale parameter has the same value at the receiving (Rx) RLC entity and transmitting (Tx) RLC entity, or
    as specifying the maximum RLC PDU size in the flexible RLC PDU size mode, where the maximum RLC PDU size may in turn additionally be used as the RLC Scale parameter described above.

Protocol parameters signaled by upper layers such as the RRC to the RLC, including but not limited to Poll_PDU, Poll_SDU, Configured_Tx_Window_Size, and Configured_Rx_Window_Size (see 3GPP TS 25.322 V. 7.1.0 Section 9.6), may be specified and interpreted in the following two ways:

In number of PDUs, or service data units (SDUs) in the case of Poll_SDU, which is an integer value from which the RLC can derive the window size in octets by performing a mathematical calculation. For example, the specified number of PDUs (or SDUs in case of Poll_SDU) can be multiplied with the RLC Scale parameter in octets as specified by upper layers.

In units of bytes, where a new field may be defined for this option to hold the protocol parameter in bytes.

In an RLC STATUS PDU, a Window Size Super Field (SUFI), used by the receiver to configure the window size of the transmitter, is configured to provide an octet quantity. This enhancement is used when flexible RLC PDU size mode is set by RRC as described above, and may be specified in two ways:

In number of PDUs from which the RLC derives the equivalent quantity in octets by performing a mathematical calculation. For example, the specified number of PDUs may be multiplied with the RLC scale parameter in octets specified by upper layers and described above.

In units of bytes as a new SUFI with type, length and value components. For example, a currently unused or reserved type field of 4 bits in length, such as bits 1000 shown in Table 1, may be used to introduce a new SUFI type for specifying the number bytes, WINDOW_BYTES SUFI, as shown in Table 1 and FIG. 1, where the SUFI length component is defined large enough to hold the largest possible window size SUFI value in bytes.

TABLE 1

Definition of a new SUFI type 1000 for the WINDOW_BYTES SUFI added to the existing SUFI type fields which are 4 bits long

| Bit | Description |
|---|---|
| 0000 | No More Data (NO_MORE) |
| 0001 | Window Size (WINDOW) |
| 0010 | Acknowledgement (ACK) |
| 0011 | List (LIST) |
| 0100 | Bitmap (BITMAP) |
| 0101 | Relative List (Rlist) |
| 0110 | Move Receiving Window (MRW) |
| 0111 | Move Receiving Window Acknowledgement (MRW_ACK) |
| 1000 | Window Size Bytes (WINDOW_BYTES) |
| 1001-1111 | Reserved (PDUs with this encoding are invalid for this version of the protocol) |

RNC/Node B Flow Control

Enhancements to RNC/Node B flow control are described herein for the case where the RLC entity is retained in the RNC. However, similar enhancements may be defined where the RLC entity is in the RNC and the Node B. According to existing 3GPP standards, as described in 3GPP TS 25.425 for the UTRAN Iur interface user plane protocols for Common Transport Channel data streams between an RNC and Node B, and 3GPP TS 24.435 for the UTRAN Iub interface user plane protocols for Common Transport Channel data streams between two RNCs, a data MAC (MAC-d) entity may be retained in the RNC to receive RLC PDUs and forward them to the high speed MAC (MAC-hs) entity in the NodeB after applying appropriate header information. In 3GPP legacy systems, the Node B sends capacity allocation frames to a serving RNC (SRNC), and possibly control RNC (CRNC), indicating the maximum PDU size and number of PDUs that can be sent. Additionally, parameters can be sent so that the allocation is periodic for a fixed number of periods or for an indefinite period of time.

The number of MAC PDUs sent from the RNC to the Node B and the corresponding time interval for transmission is regulated by a flow control algorithm, which is based upon a credit allocation scheme. Credits represent the number of MAC-d PDUs that may be transmitted. The RNC requests credits and the Node B grants them along with a specified time interval for transmission.

When the RLC PDU size is variable, the MAC-d PDU size is therefore also variable. Thus, it is insufficient to specify the number of credits in terms of the number of MAC-d PDUs. There are multiple possible approaches to performing RNC/Node B flow control with a variable sized MAC-d PDU. One possibility is to eliminate RNC/Node B flow control, however, this would require relying on user data protocols such as transport control protocol (TCP) to do the flow control for the network, and additionally handle the interaction between the TCP window and the RLC window.

Alternatively, the credit allocation can be specified in bytes instead of in number of PDUs, which can be done in two ways. A new field may be added to existing frames to specify the number of bytes of credits instead of the number of PDUs. Alternatively, an indication can be signaled at radio bearer setup or reconfiguration, or in each applicable control frame using an existing control frame or a new control frame, which indicates that the allocation is actually a byte allocation by multiplying the credit by the maximum PDU size in bytes producing a byte total. Accordingly, the maximum number of PDUs that can be transferred from the RNC to the Node B would not equal the signaled credit in terms of a number of PDUs, but would be limited by the total number of bytes in the PDUs. Using a byte-based approach, the RNC may optionally maintain a mapping of the PDU SN to its length in bytes. Once the RNC receives the credit allocation from the Node B, it is allowed to transmit as many PDUs as it can without violating the byte length constraint specified by the new byte-length based credit allocation.

FIG. 2 shows a flow diagram of a RNC/Node B flow control using a byte-based credit allocation. A Node B signals a credit allocation in bytes (step 205). An RNC receives the credit allocation in bytes (step 210). The RNC maintains a mapping of PDU SN to PDU length in bytes (step 220), and transmits PDUs without exceeding the received credit allocation (step 220).

RLC Flow Control

RLC flow control is achieved by advancing the RLC Tx window when the PDU at the lower end of the utilized transmission (Tx) window is positively acknowledged, and thus received correctly, while still staying within the limits imposed by the maximum window size. The PDU at the lower end of the Tx window is defined as the PDU following the last in-sequence PDU acknowledged. For the case when flexible RLC PDU size is configured, appropriate steps should be taken so that the maximum window size limit is not violated. The Tx window size is specified in terms of bytes.

FIG. 3 shows a flow diagram for a method for updating an RLC transmission (Tx) window 300. Following initialization and setup of the RLC, an RLC Tx operation is executed (step 305). An RLC Tx operation may be, for example, the reception of status and control information form the RLC receiver. The RLC Tx entity decides whether or not to remove one or more PDUs from the utilized Tx window and increase the lower end the utilized Tx window (step 310). One or more PDUs may be removed if:

the PDU(s) were positively acknowledged by the receiver, or the PDU(s) were negatively acknowledged by the receiver, but the RLC transmitter decides to discard this PDU due to other reasons such as the receiver exceeding the transmitter's maximum number of retries, or as a result of a timer based discard in the transmitter.

For ease of description, the following notation is used for certain quantities related to the RLC Tx entity:

TxWMAX: length in bytes of maximum window size

TxWUTIL: length in bytes of utilized Tx window, or alternatively, the length in bytes of packets that are acknowledged within the window bounded by state variables V(A) and V(T)

TxL: length in bytes of the one or more PDUs that are discarded due to RLC SDU discard procedure or due to reception of one or more acknowledgements TxN: length in bytes of the next one or more PDUs to be transmitted for the first time The RLC Tx entity computes the following window length (WL) quantity (step 315):

$$WL = TxWUTIL - TxL + TxN. \quad \text{Equation (1)}$$

The RLC Tx entity determines if the WL quantity is less than the maximum window size TxWMAX (step 320). If WL is not less than TxWMAX, then the next one or more PDUs are not transmitted and the upper end of the window is not increased (step 325). If WL is less than TxWMAX, then the next one or more PDUs are transmitted and the upper end of the window is increased (step 330).

Figure 4:
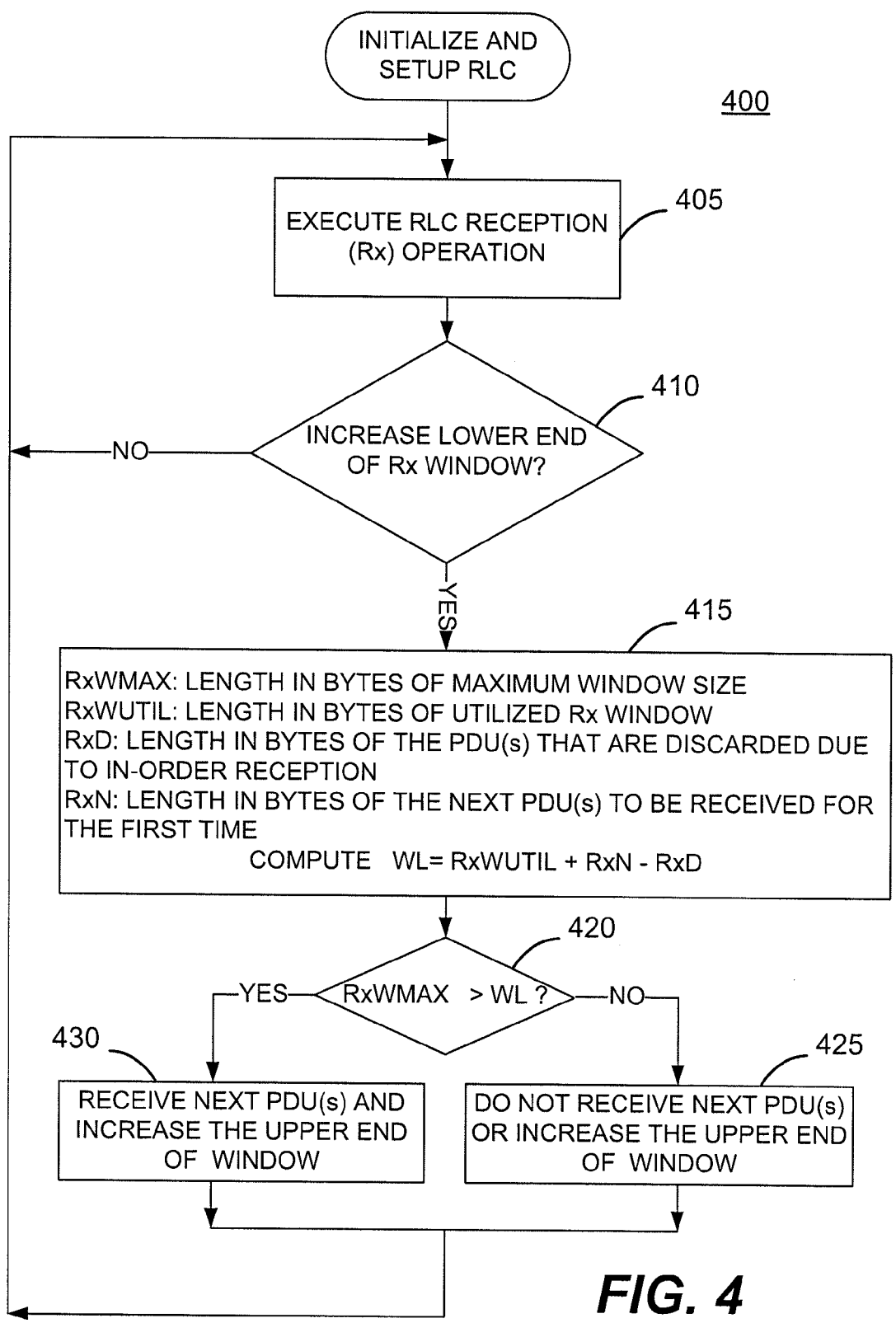
FIG. 4 shows a flow diagram of an RLC reception (Rx) window update in accordance with the teaching herein.

A similar RLC flow control method is applied at the RLC Rx entity when flexible RLC PDU size is configured, in order to ensure that the maximum window size limit is not violated. The Rx window size is specified in terms of bytes. FIG. 4 shows a flow diagram of a method for updating an RLC reception (Rx) window 400 in accordance with the teachings herein. After initialization and setup of the RLC, an RLC Rx operation is executed (step 405). An RLC Rx operation may be, for example, the reception of a new PDU. The RLC Rx entity decides whether or not to increase the lower end the Rx window (step 410). The RLC Rx entity may increase the lower end of its Rx window and thereby decrease RxWUTIL if:

it receives the PDU with SN following that of the last in-sequence PDU received, or it receives a Move Receiving Window (MRW) from RLC Tx entity.

For ease of description, the following notation is used for certain quantities related to the RLC Rx entity:

RxWMAX: length in bytes of maximum window size

RxWUTIL: length in bytes of utilized Rx window

RxD: length in bytes of one or more PDU(s) that are removed from the receive window due to in-order reception RxN: length in bytes of the next one or more PDU(s) to be received for the first time The RLC Rx entity computes the following window length (WL) quantity (step 415):

$$WL = RxWUTIL + RxN - RxD. \quad \text{Equation (2)}$$

The RLC Rx entity determines if the WL quantity is less than the maximum window size RxWMAX (step 420). If WL is not less than RxWMAX, then the next PDU(s) are not received and the upper end of the Rx window is not increased (step 425). If WL is less than RxWMAX, then the next PDU(s) are received, without discarding the PDU with a SN following that of the highest received SN, and the upper end of the Rx window is increased (430).

The setting of the RLC transmitter and receiver state variables using octet-based methods is described hereinafter. When flexible RLC PDU size mode is set by the RRC layer and the RLC operates in AM, AM data RLC PDUs are numbered by modulo integer sequence numbers (SN) cycling through a field. Generally, this field ranges from 0 to 4095, although a different maximum value may be configured by the RRC or other upper layers. Recall that arithmetic operations on VT(S), VT(A), VT(MS), VR(R), VR(H) and VR(MR) are affected by the SN modulus.

A parameter or state variable Maximum_Tx_Window_Size in octets may be maintained by the RLC transmitter. This parameter is initially set equal to the protocol parameter Configured_Tx_Window_Size in octets sent by the upper layers, and may be updated later to an octet quantity indicated by the Window Size SUFI in a RLC STATUS PDU. The state variable VT(WS) may be derived from the Maximum_Tx_Window_Size in octets, and may be set equal to the largest non-negative integer not greater than 4095 (or a maximum value configured by RRC/upper layers), such that the octet length of the window bounded by VT(A) and VT(A)+VT(WS) does not exceed the Maximum_Tx_Window_Size in octets. The state variable VT(WS) is updated when the Maximum_Tx_Window_Size in octets is updated. Alternatively, the state variable VT(WS) may be derived as the largest non-negative integer not greater than 4095 (or a maximum value configured by RRC/upper layers), such that the octet length of the window bounded by VT(A) and VT(A)+VT(WS) does not exceed:

the protocol parameter Configured_Tx_Window_Size in octets, and the Window Size SUFI referring to an octet quantity in a RLC STATUS PDU as defined above.

The state variable VT(MS) is a SN calculated as VT(MS)= VT(A)+VT(WS) where VT(WS) is derived as described above. The state variable VR(MR) is a SN derived from the Configured_Rx_Window_Size in octets sent by upper layers, such that the length in octets of the window bounded by VR(R) and VR(MR) is as large as possible but not exceeding the Configured_Rx_Window_Size in octets.

Enhancement to RLC PDU Creation

Figure 5:
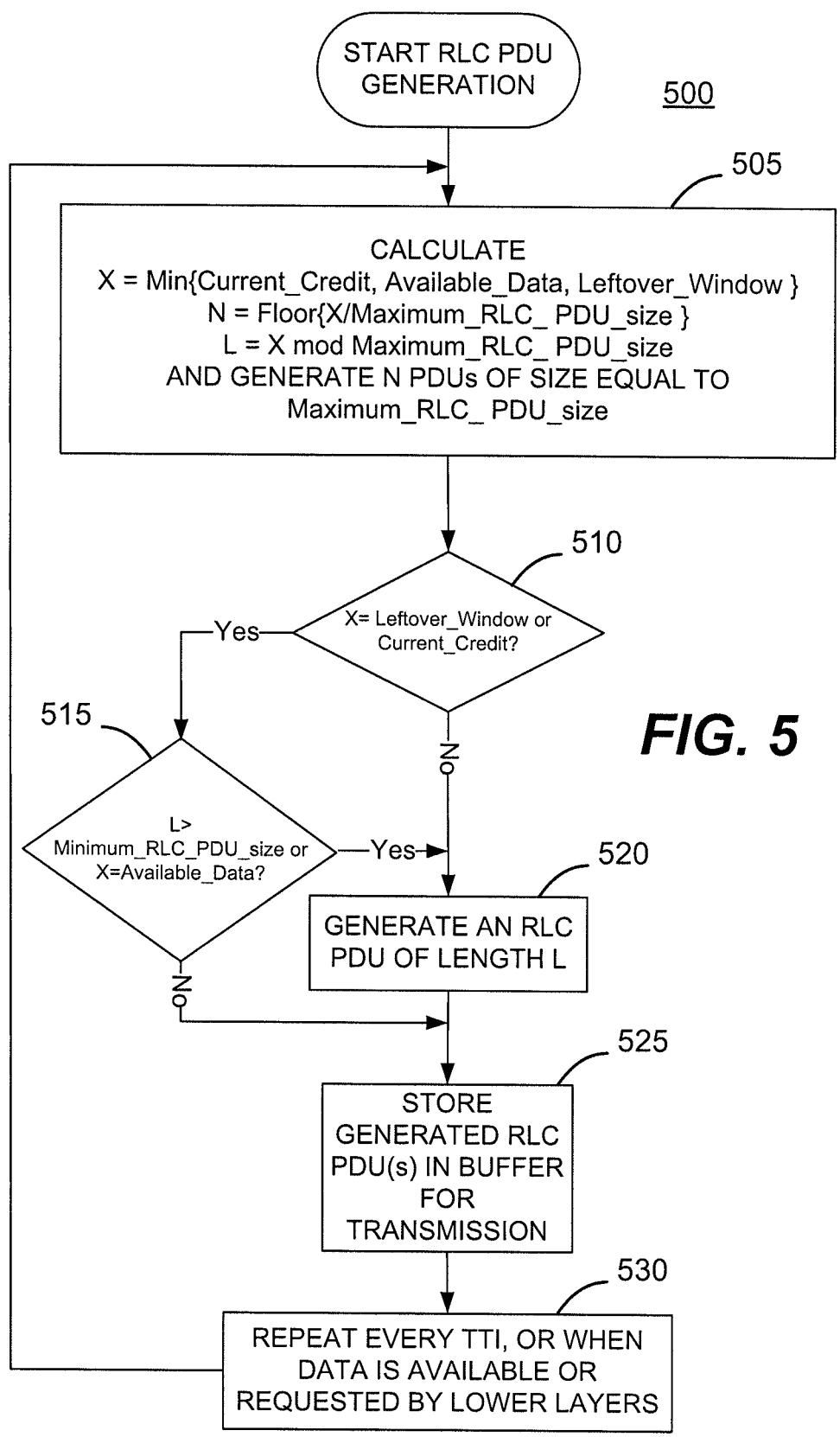
FIG. 5 shows a flow diagram for enhanced octet-based RLC PDU creation in accordance with the teachings herein.

FIG. 5 shows a flow diagram for a method for enhanced octet-based RLC PDU creation 500 for both uplink and downlink, based on the following parameters:

Current_Credit: In the uplink, this is the amount of data that can be transmitted based on MAC link adaptation and is sent by the MAC to the RLC in the UE, or in the Node B in flat architecture systems such as long term evolution (LTE) and Release 8 wideband code division multiple access (WCDMA) systems. In the downlink, this is the result of the remaining credit allocation plus any new credit allocation sent from the Node-B to RNC. This quantity is represented in octets.

Available_Data: This is the data available to be transmitted in RLC entity. This quantity is represented in octets.

Leftover_Window: This is the length of the window bounded by VT(S) and VT(MS) in the RLC transmitter. This quantity is represented in octets.

Maximum_μLC_PDU_size: This the maximum RLC PDU size as configured by the upper layers, for example, the RRC layer.

Minimum_μLC_PDU_size: This is a parameter configured by the upper layers, for example, the RRC Layer, which specifies the minimum RLC PDU size. Alternatively, the upper layers may specify the minimum RLC PDU payload size from which the Minimum_RLC_PDU_size may be inferred.

Upon initiation of RLC PDU generation, in each transmission time interval (TTI), the following quantities are calculated (step 505):

$$X=\text{Min}\{Current\_Credit, Available\_Data, Leftover\_Window\} \quad \text{Equation (3)}$$

$$N=\text{Floor}\{X/Maximum\_RLC\_PDU\_size\} \quad \text{Equation (4)}$$

$$L=X \bmod Maximum\_RLC\_PDU\_size \quad \text{Equation (5)}$$

where the function Min{•} returns the minimum value from the set, the function Floor{•} returns the nearest lower integer value, and a mod b is the modulo b division of a. N RLC PDUs of size Maximum_RLC_PDU_size are generated (step 505). Optionally, if L is different than zero, one additional RLC PDU may be created for the TTI. It is determined if X is equal to the Leftover_Window or Current_Credit parameters (step 510). If so, it is determined if L is greater than the Minimum_RLC_PDU_size parameter or if X is equal to the Available_Data (515). If L is greater than the Minimum_RLC_PDU_size, or if X is equal to the Available_Data, then an RLC PDU of length L is generated (520). Also, if X is not equal to Leftover_Window or Current_Credit, then an RLC PDU of length L is generated (520). Optionally, if L is less than Minimum_RLC_PDU_size, an RLC PDU of Minimum_RLC_PDU_size may be created. The generated RLC PDU(s) are stored in a buffer for transmission (525). The method 500 may be repeated every TTI, or alternatively when data is available or requested by lower layers (530).

As a result of method 500 described hereinbefore, the number of PDUs of length equal to the maximum RLC PDU size generated in this period of time, which is typically a TTI or some other system specified time period, is equal to the greatest non-negative integer less than Min{Current_Credit, Available_Data, Leftover_Window}/Maximum_RLC_PDU_size. If Min{Current_Credit, Available_Data, Leftover_Window}=Current_Credit, then another RLC PDU may also be generated in the same period of a size equal to Min{Current_Credit, Leftover_Window, Available_Data} mod Maximum_RLC_PDU_size. If Min{Current_Credit, Available_Data, Leftover_Window}=Available_Data, then another RLC PDU may also be generated in the same period of size equal to Min{Current_Credit, Leftover_Window, Available_Data} mod Maximum_RLC_PDU_size. If Min{Current_Credit, Available_Data, Leftover_Window}=Leftover_Window, then another RLC PDU may also be generated in the same period of size equal to Min{Current_Credit, Leftover_Window, Available_Data} mod Maximum_RLC_PDU_size, if and only if this PDU's length is greater than Minimum_RLC_PDU_size.

Variable size RLC PDU creation may also be applied without the Minimum_RLC_PDU_size and/or the Maximum_RLC_PDU_size limitations. Alternatively, it is also possible to define maximum and minimum RLC PDU size limitations and to allow the transmitter to choose a size with these limitations without requiring a TTI based relationship to MAC layer link adaptation. Alternatively, a RLC PDU of size X can be created in a system where parameters minimum_RLC_PDU_size and maximum_RLC_PDU_size are not defined.

As an alternative method for performing window management, the current state variables used for fixed RLC PDU size are maintained and can be used simultaneously with a set of new variables that deal with the byte count of flexible RLC PDUs. More specifically, some of the values maintained in terms of number of PDUs and processed as in the non-enhanced RLC may include:

The RLC transmitter state variables: VT(S), VT(A), VT(MS), VT(WS)

The RLC receiver state variables: VR(R), VR(H), VR(MR)

VT(WS) is maintained in terms of maximum number of PDUs and it is originally configured by higher layers based on the Configured_Tx_Window_size parameter provided in number of PDUs. This value can correspond to the maximum number of PDUs allowed for the window, and/or the maximum number of PDUs limited by the number of bits used for the sequence number. For example, if 12 bits are used then up to $2^{12}$ or 4096 PDUs can be supported. Optionally, for flexible RLC PDU size, the VT(WS) can be prohibited from being updated by the receiver using the WINDOW SUFI. The calculation of VT(MS) preferably remains the same, where VT(MS)=VT(A)+VT(WS). The other receiver state variables may also be maintained and processed according to 3GPP legacy standards.

In addition to these variables, the variables dealing with the byte count for the transmitter and receiver are also maintained and processed. Some variables that can be used are listed below, and are assumed to be maintained in terms of bytes. The names of these variables are used for description purposes but may be given any name. The variables include:

Configure_Tx_Window_size_bytes—This protocol parameter indicates both the maximum allowed transmission window size in octets and the value for the state variable VT(WS)_bytes. This variable can be configured, for example, in any of the following ways: by higher layers, by the network, preconfigured in the UE, or determined by the UE based on memory requirements or UE category.

VT(WS)_bytes—Transmission window size given in octets. This state variable contains the size in octets that shall be used for the transmission window. Optionally, VT(WS)_bytes shall be equal to the WSN field when the transmitter receives a STATUS PDU including a WINDOW_BYTE SUFI. The initial value and maximum value for this state variable is given by Configure_Tx Window size bytes.

Window_utilization: length in bytes of TX utilized window. For every new transmission the byte count is incremented by the RLC PDU size to be transmitted for the first time. For every PDU discarded the byte count is decremented by the RCL PDU size to be discarded.

RxWMAX: length in bytes of maximum Rx window size provided in octets by higher layers.

RxWUTIL: length in bytes of Rx utilized window. The variable will be incremented by received RLC PDU size upon reception of a new RLC PDU, and it will be decremented by RLC PDU size when a RLC PDU is removed from the buffer.

RxN: length in bytes of received PDU for the same time

The combination of the old and new state variables will allow the RLC to control the Tx and Rx windows in terms of maximum amount of bytes allowed and also in terms of maximum number of PDUs allowed (limited by the number of sequence numbers available for transmission).

RLC Procedure Affected by the Introduction of Flexible RLC PDU Size

Some of the procedures in 3GPP TS 25.322 V7.1.0 may be updated as described by the teachings herein in order to support and manage Tx and Rx windows for flexible RLC PDU include the following procedures:

Transmission of AMD PDU
Submission of AMD PDUs to lower layer
Reception of AMD PDU by the receiver
Reception of AMD PDU by the receiver
Receiving an AMD PDU outside the reception window The procedures associated with reconfiguration and re-initialization of the Tx and Rx state variables can be updated.

Transmission of Acknowledge Mode Date (AMD) PDU

For fixed RLC PDU, when AMD PDUs are retransmitted, the transmitter has to ensure that the SN of the AMD PDU is less than the maximum send variable VT(MS). The SN of retransmitted AMD PDU might be greater than VT(MS) if the window size has been updated by the receiver using WINDOW SUFI.

For flexible RLC PDU size, the transmitter can also check that the Tx window utilization up to the AMD PDU to be retransmitted does not exceed the maximum window size in bytes using state variable VT(WS)_bytes. The state variable Window_utilization is the total size of transmitted RLC PDUs in the retransmission buffer. Therefore, when this condition is checked the utilization up to the retransmitted SN has to be calculated independently. If Window_utilization is less than VT(WS)_bytes, then the condition will be met automatically, however if window_utilization is greater than VT(WS)_ bytes, the buffer utilization up to the AMD PDU has to be calculated in order to ensure that it will not exceed VT(WS)_ bytes. So optionally, the buffer utilization is calculated if the window_utilization exceeds the state variable VT(WS)_bytes.

For example, the AMD PDU transmission procedure can be modified in the following way to account for fixed and flexible RLC PDU sizes, as signaled by upper layers:

If fixed RLC PDU size is configured then:
  for each AMD PDU which has been negatively acknowledged:
    if the AMD PDU SN is less than VT(MS) then:
    schedule the AMD PDU for retransmission;
If flexible RLC PDU size is configured then:
  for each AMD PDU which has been negatively acknowledged:
    if (1) the window utilization up to the AMD PDU SN is less than VT(WS)_bytes, where this condition is always true if window_utilization<VT(WS)_ bytes, or is calculated as the used window up to SN and (2) optionally, if the AMD PDU SN is less than VT(M) then:
    schedule the AMD PDU for retransmission.

Submission of AMD PDUs to Lower Layers

One of the conditions to allow the transmission of an AMD PDU is that the AMD PDU SN is less than the state variable VT(MS). When flexible RLC PDU size is configured, an additional condition to check that the window utilization for the transmitted or retransmitted PDU does not exceed maximum window size in bytes should also be verified. The lower layers include the MAC layer and physical layer.

According to one approach, if one or more AMD PDUs have been scheduled for transmission or retransmission (see, for example, 3GPP TS 25.322 V7.1.0 subclause 11.3.2), then the sender may:

not submit any AMD PDUs that it is not allowed to transmit to lower layers. When fixed RLC PDU size is configured, an AMD PDUs is allowed to be transmitted if the AMD PDU has a SN<VT(MS) or if the AMD PDU has a SN equal to VT(S)-1. If flexible RLC PDU size is configured, then the AMD PDU is allowed to be transmitted if (1) it has a SN<VT(MS) or, optionally, the AMD PDU has a SN equal to VT(S)-1, and (2) if the transmitted AMD PDU will not cause the window utilization, determined by window_utilization+AMD PDU size, to exceed VT(WS)_bytes. Additionally, an AMD PDU is allowed to be transmitted if the AMD PDU is not restricted to be transmitted by a local suspend function (see, for example, 3GPP TS 25.322 V7.1.0 subclause).

inform the lower layers of both the number of AMD PDUs scheduled for transmission or retransmission and allowed for transmission or retransmission. Optionally, if flexible RLC PDU size is configured, the sender can inform the lower layers of the number of bytes to be scheduled.

set the AMD PDU contents according to, for example, 3GPP TS 25.322 V7.1.0 subclause 11.3.2.1.

submit to the lower layers the requested number of AMD PDUs. Optionally, if flexible RLC PDU size is configured, the sender may also submit to lower layers a number of bytes requested by the lower layers.

treat retransmissions with higher priority than AMD PDUs transmitted for the first time.

update the state variables for each AMD PDU submitted to lower layer (see, for example, 3GPP TS 25.322 V7.1.0 subclause 9.4 for the state variables) except VT(DAT), which counts the number of times a AMD PDU has been scheduled to be transmitted and which has already been updated when the AMD PDU contents are set (see, for example, 3GPP TS 25.322 V7.1.0 subclause 11.3.2).

if flexible RLC PDU size is configured, then update the window_utilization variable, therefore updating the variables associated WITH keeping track of byte count.

if (1) the polling bit, used by the transmitter to request a status report from the receiver, is set to "1" in any of the AMD PDUs, and (2) Timer_Poll, a timer for tracking AMD PDU containing a poll as indicated by lower layers, is configured, then start the timer Timer_Poll (see, for example, 3GPP TS 25.322 V7.1.0 subclause 9.5).

buffer the AMD PDUs that are not submitted to the lower layers according to a discard configuration (see, for example, 3GPP TS 25.322 V7.1.0 subclause 9.7.3).

Reception of AMD PDU by the Receiver

The procedure associated with the reception of an AMD PDU by the receiver is updated to include and update of the receiver state variables associated with the byte count for flexible RLC PDU size. The enhanced procedure is defined as follows. Upon reception of an AMD PDU, the receiver shall:
in the UE:
  if the downlink AMD PDU size has not yet been set then set the downlink AMD PDU size to the size of the received PDU.
update receiver state variables VR(R), VR(H) and VR(MR) for each received AMD PDU (see, for example, 3GPP TS 25.322 V7.1.0 clause 9.4);
if flexible RLC PDU size is configured then
  update the RxWUTIL state variable by setting RxWUTIL equal to the RxWUTIL plus the size of new received RLC PDUs minus the size RLC PDUs removed from the buffer due to in-order reception.

Receiving an AMD PDU Outside the Reception Window

If fixed RLC PDU size is configured, then upon reception of an AMD PDU with SN outside the interval VR(R) $\leq$ SN<VR(MR), the receiver shall:
discard the AMD PDU;
if the polling bit in the discarded AMD PDU is set to "1" then
initiate the STATUS PDU transfer procedure.

If flexible RLC PDU size is configured, then upon reception of a new AMD PDU whose size added to RxWUTIL exceeds RxWMAX (where RxWMAX<RxWUTIL+new received AMD PDU size or RxN) or upon reception of an AMD PDU with SN outside the interval VR(R)≦SN<VR (MR), the receiver shall:
discard the AMD PDU;
if the polling bit in the discarded AMD PDU is set to "1" then
initiate the STATUS PDU transfer procedure.
RLC Status Reporting RLC status reports containing acknowledgment information to support ARQ may be triggered in various scenarios by the RLC Tx and RLC Rx entities. In order to handle flexible RLC PDU size, the RLC Tx and RLC Rx entities can maintain a mapping of RLC PDU SN to the corresponding PDU length in bytes. This allows the calculation and maintenance of the length of the used flow control window in bytes or other byte-based metrics as described above.

An equivalent parameter to Every Poll_PDU PDU, the upper limit for the state variable VT(PDU) for keeping track of polling, can be configured in terms of bytes. In this case, the transmitter may have a PDU count polling mechanism and/or a byte count polling mechanism, such that the transmitter polls the receiver every Poll_Bytes bytes. For description purposes, it is assumed herein that the polling parameter provided by higher layers is called Poll_Bytes. If configured for polling, the RLC transmitter may trigger a status report by setting the polling bit in certain PDUs as follows:

The RLC transmitter maintains a counter of the total number of bytes transmitted in PDUs since the transmission of the last PDU containing a polling bit, where the last PDU containing a polling bit can be due to any type of polling trigger, including for example Poll_PDU, Poll_SDU or Poll_bytes, or alternatively, may be restricted to the last PDU containing a polling bit triggered due to the byte polling mechanism.

When the counter reaches or exceeds a value Poll_Bytes, the RLC transmitter sets the polling bit in the PDU (or, alternatively, the next PDU) that caused the counter to be greater than or equal to the value Poll_Bytes and resets the counter.

Herein, setting a polling bit refers to a polling request, such that a polling request may consist of POLL SUFI PDU, or it may consist of the setting of a polling bit in an AMD RLC PDU. The total number of bytes transmitted in PDUs may refer to the size of the PDUs transmitted for the first time. Alternatively, it can refer to the size of all PDUs transmitted, including retransmissions. The counted total number of bytes transmitted may only count the first transmission of the RLC acknowledged mode data (AMD) PDU, the RLC AMD PDU segment or a portion of an RLC SDU, where retransmissions of these data portions may not be counted.

Protocol parameters Poll_PDU and Poll_SDU are signaled by upper layers, such as the RRC, to the RLC layer to indicate a PDU count interval. In addition, protocol parameter Poll_Bytes in octets can be signaled and configured by higher layers. Polling procedures in an RLC transmitter may include the following:

The RLC transmitter maintains a variable Poll_Octets counter to keep track of the total number of bytes transmitted in PDUs since the transmission of the last PDU containing a polling bit, which may have been triggered due to, for example, the reception of parameters Poll_PDU, Poll_SDU or Poll_Bytes from higher layers. Poll_Octets may alternatively keep track of the total number of bytes transmitted since the last PDU containing a polling bit triggered due to the byte polling mechanism only.

The Poll_Octets counter may optionally count a total number of bytes of a first transmission of each RLC acknowledged mode data (AMD) PDU. The Poll_Octets counter may optionally count only RLC data PDUs, such that RLC control PDUs are not counted. When the Poll_Octets counter reaches the Poll_Bytes interval value, the RLC transmitter sets the polling bit in the PDU (or optionally, the next PDU) that makes the Poll_Octets counter exceed the threshold of Poll_Bytes, and resets the Poll_Octets counter. The Poll_Octets counter may also be reset if the polling bit is set due to other polling conditions such as the reception of a Poll_PDU.

When flexible RLC PDU sizes are supported for AM RLC, flexible RLC PDU size mode is set by the RRC layer, and window-based polling is configured by upper layers, protocol parameter Poll_Window is signaled by upper layers to the RLC to inform the transmitter to poll the receiver. Poll_Window can be given in terms of a percentage window or in terms of number of bytes. A poll is triggered by the transmitter for each AMD PDU when the value K is greater than or equal to parameter Poll_Window, where K is the transmission window percentage defined as:

$$K = \text{utilized\_window}/\text{Maximum\_Tx\_Window\_Size(in octets)} \quad \text{Equation (6)}$$

where utilized_window is the length in octets of the window bounded by state variables VT(A) and VT(S). The utilized_window represents the utilized buffer by the data remaining in the transmission buffer. If the Poll_Window is given in terms of number of bytes, K is equivalent to the utilized_window. Therefore, the transmitter will trigger a polling request if the utilized_window exceeds the number of bytes Poll_window signaled by the network.

The RLC transmitter can trigger a status report by setting the polling bit when the used/utilized Tx window size is above a certain system configured threshold in terms of a number of bytes or a percentage of the maximum window size. The RLC receiver can trigger a status report when the used/utilized Rx window size is above a certain system configured threshold in terms of a number of bytes or a percentage of the maximum window size. Poll_Window indicates when the transmitter shall poll the receiver in the case where "window-based polling" is configured by upper layers. A poll is triggered for each AMD PDU when: the value J is greater than parameter Poll_Window, where J is the transmission window percentage defined as:

$$J = \frac{(4096 + VT(S) + 1 - VT(A)) \bmod 4096}{VT(WS)} \times 100 \quad \text{Equation (7)}$$

where the constant 4096 is the modulus for AM as described in 3GPP TS 25.322 V7.1.0 subclause 9.4 and VT(S) is the initial value of Poll_Window before the AMD PDU is submitted to lower layers.

If flexible RLC PDU size is configured, a poll is also triggered for each AMD PDU when the value of K is greater than parameter Poll_Window, where K is defined as:

$$K = \frac{\text{Sum of } RLC\,PDU \text{ sizes from } VT(A) \text{ to } VT(S)}{\text{Maximum Transmit Window Size}} \times 100. \quad \text{Equation (8)}$$

Although the teachings herein are described in the context of RLC transmission (Tx) and RLC reception (Rx) entities, it is applicable to both uplink (UE to UTRAN/E-UTRAN) and downlink (UTRAN/E-UTRAN to UE) communications. For example, in the uplink direction, the configuration/reconfiguration of the parameter Configured_Tx_Window_Size causes:

The UE to derive the state variable VT(WS) from Configured_Tx_Window_Size as described above.

The UE to update the state variable VT(MS) as described above.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for enhancing radio link control (RLC) operations, the method comprising:
   receiving a control frame indicating a capacity allocation is a byte allocation; and
   determining, via a processor, a capacity allocation by multiplying a credit by a maximum PDU size, wherein: the capacity allocation=(the credit)×(the maximum PDU size).

2. The method of claim 1, wherein the credit is a number of PDUs.

3. The method of claim 1, wherein the capacity allocation is calculated as a number of octets.

4. The method of claim 1, further comprising receiving a frame comprising information specifying a number of bytes of credit.

5. The method of claim 4, further comprising:
   storing a mapping of a PDU sequence number (SN) to an associated length in bytes; and
   transmitting PDUs without exceeding the number of bytes of credit.

6. The method of claim 1, wherein the determining is performed by an RNC.

7. The method of claim 6, wherein the RNC is a serving RNC (SRNC).

8. The method of claim 6, wherein the RNC is a controlling RNC (CRNC).

9. The method of claim 1, further comprising determining that flexible packet data unit (PDU) size is configured.

10. A network entity comprising a memory and a processor, the network entity being configured at least in part to:
    receive a control frame indicating a capacity allocation is a byte allocation; and
    determine a capacity allocation by multiplying a credit by a maximum PDU size, wherein: the capacity allocation= (the credit)×(the maximum PDU size).

11. The network entity of claim 10, wherein the credit is a number of PDUs.

12. The network entity of claim 10, wherein the capacity allocation is calculated as a number of octets.

13. The network entity of claim 10, wherein the network entity is further configured, at least in part, to receive a frame comprising information specifying a number of bytes of credit.

14. The network entity of claim 13, wherein the network entity is further configured, at least in part, to:
    store a mapping of a PDU sequence number (SN) to an associated length in bytes; and
    transmit PDUs without exceeding the number of bytes of credit.

15. The network entity of claim 10, wherein the network entity is an RNC.

16. The network entity of claim 15, wherein the RNC is a serving RNC (SRNC).

17. The network entity of claim 15, wherein the RNC is a controlling RNC (CRNC).

18. The network entity of claim 10, wherein the network entity is further configured, at least in part, to determine that flexible packet data unit (PDU) size is configured.

* * * * *